United States Patent Office 3,420,388
Patented Jan. 7, 1969

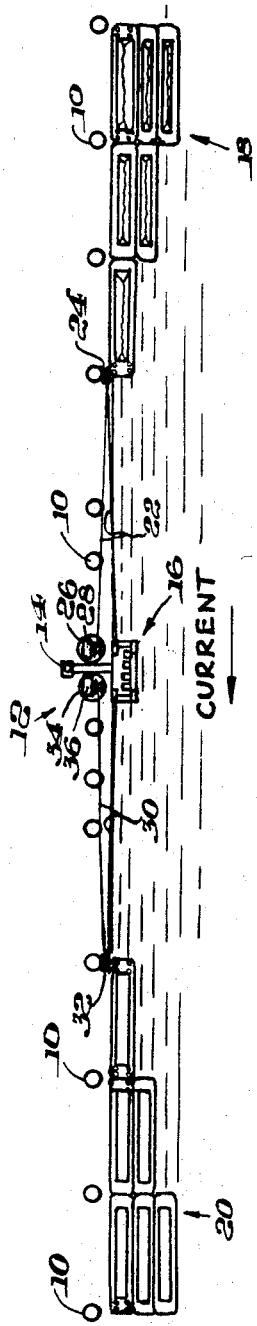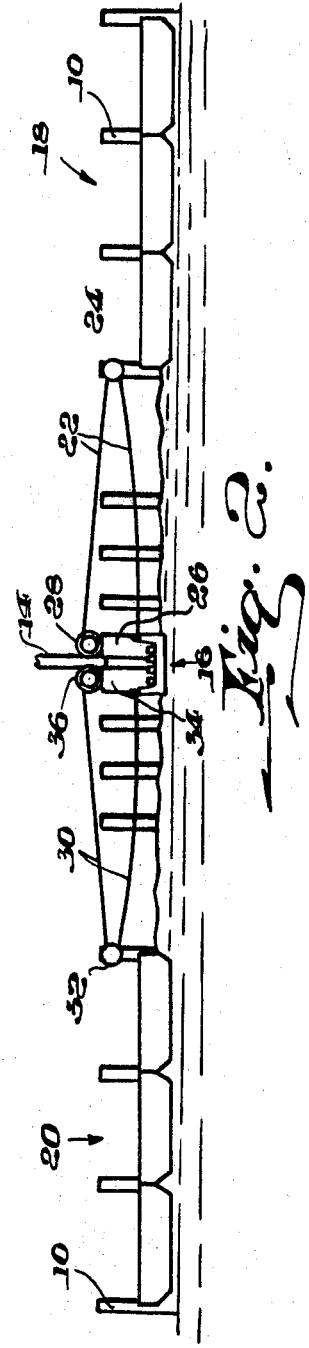

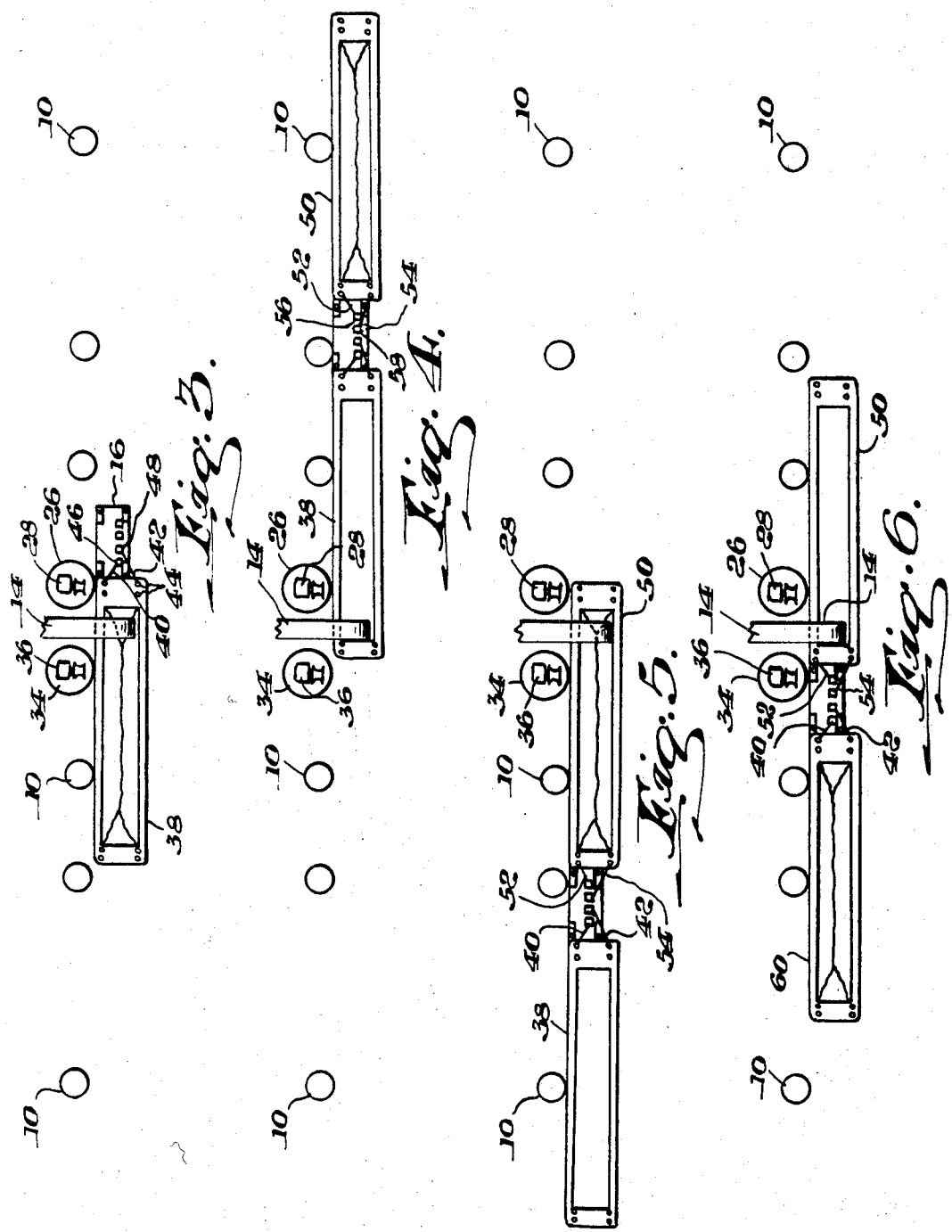

3,420,388
BARGE HANDLING AND UNLOADING SYSTEM AND METHOD OF HANDLING AND UNLOADING BARGES
Aubrey C. Briggs, Carnegie, Pa., assignor to Dravo Corporation, Pittsburgh, Pa., a corporation of Pennsylvania
Filed Oct. 31, 1967, Ser. No. 679,370
U.S. Cl. 214—14                                                      8 Claims
Int. Cl. B63b 27/00

ABSTRACT OF THE DISCLOSURE

A barge handling and unloading system and method of handling and unloading barges is disclosed in which a shuttle barge is utilized to move loaded cargo barges in a fore-and-aft direction past an unloading station. A mechanical barge unloader is located at the unloading station and cargo is removed from the cargo barges by the barge unloader during the course of the fore-and-aft movements and transferred to shore.

BACKGROUND OF THE INVENTION

*Field of the invention*

This invention relates to a barge handling and unloading system and method of handling and unloading barges and more particularly to such a system and method wherein a shuttle barge having haul lines permanently attached thereto is utilized to shuttle loaded barges back and forth under a mechanical unloader which removes the material contained in the barges.

DESCRIPTION OF THE PRIOR ART

Cargo barges used in the hauling of bulk material such as coal, sand and gravel on inland waterways are generally assembled in a group and transported as a unit or tow by a towboat. Docking facilities on the rivers generally comprise a series of spaced concrete columns called cells, located at intervals in a line a short distance from shore and near the center of this line of cells a mechanical barge unloader is positioned in such manner as to extend outwardly beyond the row of cells and arranged to remove the contents of the barge and transfer it to shore. The towboat usually moors the entire tow of loaded cargo barges upstream of the unloader. The loaded barges are then moved either by a towboat or by barge haul lines on shore one at a time to the unloader, unloaded and then moved, either by towboat or other barge hauling lines downstream of the unloader and reassembled into a tow of empty barges. In unloading, the load is generally removed more or less uniformly lengthwise of the barge so as to keep the barge reasonably level. These barges are flat-bottom vessels of relative shallow draft and vary in width from a usual minimum of about 26 feet to a maximum of about 50 feet, and their length commonly exceeds 100 feet and even exceeds 200 feet. It is not practical, therefore, to start at one end of the barge and remove all of the material and then work toward the other end because of the structural stresses in the barge that occur with one end loaded and the other end empty. Accordingly, it is the better practice to unload a barge by shuttling it back and forth under an unloader, usually beginning at one end and working toward the other, but removing only a part of the total load on each pass. When the other end is reached, the barge is hauled back to the starting position and a second unloading pass is made, and this cycle may be repeated, if two are not sufficient until the barge is empty. In some cases, two haul lines are used to shuttle the barge being unloaded beneath the unloader. One is connected at one end thereof with the forward end of the barge and the other is connected at one end thereof with the rear end of the barge. Each of the other ends of the haul lines is connected with a separate winch, but in some cases there may be a single haul line with its opposite ends attached to the opposite ends of the barge while the looped cable passs around a reversible winch, as is well understood in the art.

The winch means, however the cable is reeved, is arranged to exert an upstream pull and a downstream pull relative to the unloader. By means of this arrangement, the barge to be unloaded may be hauled upstream and downstream beneath the unloader and unloaded as above-described. By this practice a barge may be rapidly unloaded while, if important, the barge may be kept on a substantially even keel. For example, a fully loaded barge containing approximately 1500 tons of cargo may be completely unloaded in approximately 35 minutes with little manual labor. But the advantage of speedily unloading a barge as above described is lost by reason of the time needed to disconnect the haul lines from the unloaded barge, secure the unloaded barge to a towboat or other on-shore barge haul lines for removal thereof from the vicinity of the unloader, and the time required to then bring another loaded barge to the unloader and attach the barge haul lines thereto.

SUMMARY

Briefly, a barge handling and unloading system and method of handling and unloading barges is provided by the present invention, wherein at least one pair of anchor points, cells or piers spaced from one another along the shore line a distance exceeding the length of two barges is utilized in practicing the invention. An unloading station is located between the pair of cells with and unloader positioned at the unloading station for removing the cargo from loaded barges and transferring it to the shore. A shuttle barge is provided which is arranged to be moved along the shore in front of the dock face and between these anchor points. First means are associated with the shuttle barge for selectively connecting and disconnecting the shuttle barge to and from a selected one of the loaded barges. Second means including haul lines are associated with the shuttle barge and with the pair of spaced cells or anchor points for effecting repeated fore-and-aft movements of the shuttle barge. The arrangement being such that when the shuttle barge is connected to a selected one of the loaded barges, the selected one of the loaded barges may then be moved in a fore-and-aft direction past the unloading station whereby material may be removed therefrom by the unloader during the course of its fore-and-aft movements.

With the present invention, the haul lines may be permanently secured to the shuttle barge thereby avoiding any delay in connecting and disconnecting the haul lines with the barge to be unloaded, and eliminate the labor involved in handling the long heavy haul lines as has heretofore been necessary. In order to move a barge to be unloaded beneath the unloader it is only necessary to connect the loaded barge by relatively light easily handled short securing lines to the shuttle barge. Also, by the use of the present barge handling and unloading system and method of handling and unloading barges a second barge to be unloaded may be maneuvered from the tow of loaded barges into position during the unloading of the first barge and readily secured to the shuttle barge during the unloading of the first barge then connected to the shuttle barge, thereby avoiding any delay in the disconnecting and connecting of conventional haul lines. During unloading of the second barge, the first barge may be disconnected from the shuttle barge and maneuvered to the place where the empty barges are being assembled. With the first barge out of the way, a third loaded barge may then be attached to the shuttle barge in the place of the first and while the unloading of the second barge is continuing.

Thus by alternately replacing empty barges at upstream and downstream ends of the shuttle barge, a tow of several loaded barges may be unloaded without material interruption.

Accordingly, it is an object of the invention to provide a barge handling and unloading system and method of handling and unloading barges wherein a shuttle barge having haul lines permanently secured thereto is utilized to move barges in a fore-and-aft direction beneath an unloader.

Another object of the invention is to provide a shuttle barge having haul lines permanently secured thereto which permits the maneuvering of a loaded barge into position during the unloading of a barge for connection to the shuttle barge and the removal of the unloaded barge from the vicinity of the unloading machine in a minimum amount of time.

These and other objects and advantages are secured by my invention which may be more fully understood by reference to the accompanying drawings.

BRIEF DESCRIPTION OF THE DRAWINGS

FIGURE 1 is a schematic plan view of the barge handling and unloading system of the present invention illustrating the overall arrangement of the spaced apart cells, the shuttle barge, the mechanical barge unloader and the loaded cargo barges, each of which is to be successively unloaded by a plurality of passes under the unloader.

FIGURE 2 is a view in side elevation of the barge haul system shown in FIG. 1.

FIGURES 3-6 are plan views similar to FIG. 1 but on an enlarged scale with some of the parts of the barge handling and unloading system not shown illustrating a succession of operations in the method of handling and unloading barges of the present invention.

DESCRIPTION OF THE PREFERRED EMBODIMENTS

Referring now to the drawings, FIGURES 1 and 2 show a typical inland river docking arrangement comprising a plurality of spaced apart anchor points, piers or cells 10, these being arranged in a line close to shore. These cells 10 are generally constructed of steel pilings filled with gravel and are of the type commonly used along inland waterways for docking purposes. An unloading station is shown generally at 12 and an unloader 14 for transferring bulk material from a barge to shore is shown positioned at the unloading station 12. The unloader 14 may be of the elevating bucket conveyor type disclosed in copending application Ser. No. 526,875, filed Feb. 11, 1966, now Patent No. 3,356,232, and is here shown schematically. A shuttle barge, adapted to move parallel to the line of cells 10, is shown generally at 16. A first plurality or tow of loaded cargo barges 18 is located on the right side of the unloading station 12 as viewed in FIG. 1, this usually being the upstream side for ease in maneuvering the loaded barges, and a second plurality of empty barges 20 are located on the left side of the unloading station 12.

The shuttle barge 16 has a cable or haul line 22 secured thereto at one end thereof which extends from the shuttle barge 16 to a sheave 24 anchored to one of the cells 10 or other remote anchor points. The haul line 22 passes over sheave 24 and then extends to cell 26 located in the vicinity of the unloading station 12 where it wraps about the drum of a power driven winch means 28 mounted atop the cell 26. Another cable or haul line 30 is secured to the other end of shuttle barge 16 and extends therefrom to a sheave 32 secured to another of the cells 10 or anchor point. The haul line 30 passes over the sheave 32 and then extends to cell 34, which is adjacent to cell 26, where it wraps about the drum of a power driven winch 36 mounted atop the cell 34. Alternatively, the power driven winches 28 and 36 may be a single power driven winch with the lines 22 and 30 connected and wrapped thereabout in a continuous loop fashion. The sheaves 24 and 32 are attached to cells or other anchor points which are separated, along the shore more than two full barge lengths.

In order to effect fore-and-aft movements to the shuttle barge 16, power driven winches 28 and 36 are alternatively or reversely actuated to haul the shuttle barge upstream and downstream.

Now referring to FIGS. 3-6, which illustrate one cycle of a method of efficiently moving the loaded barges 18 past the unloader 14 in a minimum amount of time, one loaded barge 38 has been selected from the plurality of loaded barges 18 and has been connected with the shuttle barge 16 which has been moved to the position shown. Barge 38 is attached to the shuttle barge 16 by the relatively light and easily handled short securing lines 40 and 42. Line 40 is secured at one end thereof to one of the securing bits 44 on the barge 38 and extends back therefrom to the shuttle barge 16 where it wraps about the drum of a hand or power driven winch 46 mounted on the shuttle barge 16. Similarly, line 42 is secured at one end thereof to another one of the securing bits 44 and extends back therefrom to the shuttle barge 16 where it wraps about the drum of another similar winch 48 mounted on the shuttle barge 16. The securing lines 40 and 42 associated with the winches 46 and 48, respectively, permit quick connecting and disconnecting of barges to the shuttle barge 16. Also, because of the association of the lines 40 and 42 with the winches 46, 48 any slack subsequently occurring in these securing lines may be readily taken up by actuation of the winches 46, 48.

With the barge 38 secured to the shuttle barge 16 and positioned as shown under the unloader 14, the winch means 28 will be actuated and the barge 38 and shuttle barge 16 will be slowly moved upstream. A portion of the material in barge 38 will be removed by the unloader 14 during this first pass which is referred to as a "hogging pass." When the hogging pass has been completed the full length of the barge, the winch 36 will be actuated and will move the shuttle barge 16 and barge 38 downstream back to its starting position. Then the winch 28 will again be actuated and the barge 38 and shuttle barge 16 will again be slowly moved upstream. During the course of this second trip upstream another portion of the material in barge 38 will be removed by the unloader 14, this pass being referred to as the "second hogging pass." When the second hogging pass has been completed the full length of the barge 38, the winch 36 will be actuated and will move the shuttle barge 16 and barge 38 downstream back to its starting position. This cycle is repeated until finally a "clean-up pass" is made which removes the remainder of the material in the barge 38. This clean-up pass may be the third pass or a later pass depending upon capabilities, the unloader machine 14 and the dimensions of the barge 38. This repeated passing of the loaded barge 38 past the unloader 14 and the operation of the unloading machine is more fully described in the above-mentioned co-pending application. During the unloading of barge 38, a loaded barge 50 selected from the plurality of loaded barges 18, which has previously been maneuvered into the position shown in FIG. 4 by a tug or towboat (not shown) is connected with the shuttle barge 16. The loaded barge 50 is connected with the shuttle barge 16 by relatively short securing lines 52 and 54 which are associated with another pair of winches 56 and 58 on the shuttle barge. The four winches 46, 48, 56 and 58 are commercially available and are all of similar construction and function in like manner. The winches 46, 48, 56 and 58 releasably hold a cargo barge tight against either or both ends of the shuttle barge 16. When the clean-up pass is finally made the shuttle barge and the now unloaded barge 38 will be in the position shown in FIG. 4. With both the now unloaded barge 38 and the loaded barge 50 connected at opposite ends to the shuttle barge 16, the winch 36 is actuated and the shuttle barge together with the barges 38 and 50 are moved downstream to the position shown in FIG. 5 where the unloading of barge 50 will begin in the manner above described in the unloading of barge 38. During the unloading of barge 50, the barge 38 is disconnected from the shuttle barge 16 and moved to the tow of empty barges 20.

When the clean-up pass of barge 50 is finally made and completed the barge 50 will be in position shown in FIG. 6. During the unloading of barge 50, a loaded barge 60 selected from the plurality of loaded barges 18, which has previously been placed in the position shown in FIG. 6 a tug or towboat (not shown), is connected to the shuttle barge 16 by means of the securing lines 40 and 42. During the unloading of barge 60 the now unloaded barge 50 is disconnected from the shuttle barge and removed from the vicinity of the unloading station 12 and moved to the tow of empty barges 20. The loaded barge 60 will then be unloaded as above described.

This selection of loaded barges from the plurality of loaded barges 18 in the manner just described may, of course, be continuously repeated or performed in reverse order to the method as just described.

It can readily be seen that because the shuttle barge 16 has the heavy haul lines 22 and 30 permanently secured thereto, there is no need of repeatedly securing and unsecuring the haul lines to the loaded barges as in the past. Further, because it is only necessary to use relatively light short securing lines to connect the loaded barges to the shuttle barge 16 and because of the manner in which barges may be easily attached to and disconnected from the shuttle barge, the advantages of speedily unloading a barge as above described are not lost in time consuming change of haul lines. A loaded barge may be maneuvered into position for connection to the shuttle barge 16 and the previously emptied one removed while another barge is being unloaded thereby avoiding the delay which in the past was necessary in order to remove the unloaded barge from the vicinity of the unloader before another loaded barge could be brought to the unloader. It may be pointed out that the barge haul cables 22 and 30 are passed around anchor sheaves 24 and 32 respectively so that the winches 28 and 36 and their controls may be close to the operator who controls the unloader. Also, while I have shown and described the shuttle barge 16 as being somewhat smaller than the other barges, it is to be understood that the shuttle barge 16 may be of the same length as the other barges.

I claim:

1. In a barge handling and unloading system:
   (a) a barge unloader for transferring bulk material from a cargo barge to shore,
   (b) a docking arrangement extending along the shore from each side of the unloader a distance greater than the length of two barges,
   (c) a shuttle barge,
   (d) hauling means operatively connected to the shuttle barge and the docking arrangement for moving the shuttle barge back and forth along the docking arrangement,
   (e) and means on the shuttle barge for releasably holding a cargo barge tight against both ends thereof at the same time.

2. A barge handling and unloading system as defined in claim 1 wherein the hauling means arranged for moving the shuttle barge back and forth along the docking arrangement comprises winch operated haul lines extending away from the unloader in opposite directions along the docking arrangement an effective distance greater than the length of a barge plus the length of the shuttle barge whereby the shuttle barge may be selectively moved to one side or the other of the unloader a distance greater than the length of one barge.

3. A barge handling and unloading system as defined in claim 2 wherein the docking arrangement comprises a plurality of spaced in-line cells and the barge haul lines pass around sheaves anchored to one of said cells upstream and downstream from the unloader, the winches for operating said lines being positioned adjacent the unloader.

4. A barge handling and unloading system as defined in claim 1 wherein said means on the shuttle barge for holding a cargo barge tight against each end of the shuttle barge comprises winch means on the shuttle barge and cables extending in opposite directions therefrom.

5. In a barge handling and unloading system, apparatus comprising:
   (a) a pair of anchor points spaced from one another,
   (b) an unloading station located between said pair of anchor points including a barge unloader for transferring material from a barge to shore,
   (c) a shuttle barge,
   (d) means on the shuttle barge for releasably attaching a barge to either end thereof,
   (e) means associated with said shuttle barge and said pair of anchor points for effecting repeated fore-and-aft movements of said shuttle barge, the arrangement being such that when the shuttle barge is connected with a loaded barge the barge may be moved in a fore-and-aft direction past said unloading station whereby material may be removed from the barge by the barge unloader during the course of the fore-and-aft movements.

6. In a barge handling and unloading system, apparatus according to claim 5 wherein said means on the shuttle barge for releasably attaching a barge to either end thereof comprises a plurality of winch means secured to said shuttle barge, each of said plurality of winch means including a cable member for releasably connecting a barge to the shuttle barge.

7. In a barge handling and unloading system, apparatus according to claim 5 wherein said means associated with said shuttle barge and said pair of anchor points for effecting repeated fore-and-aft movements of the shuttle barge comprises a first sheave secured to one of said pair of anchor points, a second sheave secured to the other of said pair of anchor points, oppositely functioning winch means fixed with relation to the sheaves and shuttle barge, and cable means operatively engaged with the winch means and said sheaves, and being attached to the shuttle barge for moving the shuttle barge back and forth with respect to the unloader.

8. The method of handling and unloading a number of barges in succession wherein each barge is moved lengthwise beneath a mechanical unloader and the cargo unloaded therefrom in a series of passes beneath the unloader comprising the steps of:
   (a) attaching a first barge to one end of a shuttle barge,
   (b) moving the shuttle barge and first barge attached thereto alternately upstream and downstream with the first barge moving lengthwise its full length beneath the unloader to unload the cargo therefrom in a series of passes beneath the unloader,
   (c) maneuvering a second barge into position for ready attachment to the opposite end of the shuttle barge during the unloading of the first barge,
   (d) attaching the second barge to the shuttle barge during unloading of the first barge,
   (e) moving the shuttle barge and second barge attached thereto alternately upstream and downstream with the second barge moving lengthwise its full length beneath the unloader to unload the cargo therefrom in a series of passes beneath the unloader,
   (f) disconnecting the first barge from the shuttle barge during unloading of the second barge,
   (g) maneuvering a third barge into position for ready attachment to that end of the shuttle barge from which the first barge has been disconnected during the unloading of the second barge, (h) attaching the third barge to the shuttle barge during unloading of the second barge, (i) moving the shuttle barge and third barge attached thereto alternately upstream and downstream with the third barge moving lengthwise its full length beneath the unloader to unload the cargo therefrom in a series of passes beneath the unloader, (j) disconnecting the second barge from the shuttle barge during unloading of the third barge, and (k) repeating the cycle in which loaded barges are maneuvered into position, alternately attached to opposite ends of the shuttle barge and empty barges disconnected therefrom and the loaded barges unloaded until all have been unloaded.

References Cited
UNITED STATES PATENTS 3,104,766   9/1963   Sasad _____ 214—14

GERALD M. FORLENZA, *Primary Examiner.*

F. E. WERNER, *Assistant Examiner.*

U.S. Cl. X.R.

214—152